(12) United States Patent
Nakanishi

(10) Patent No.: US 12,159,002 B2
(45) Date of Patent: Dec. 3, 2024

(54) DETECTING DEVICE AND DETECTION SYSTEM USING DIFFERENT THRESHOLD LEVELS

(71) Applicant: Japan Display Inc., Tokyo (JP)

(72) Inventor: Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 64 days.

(21) Appl. No.: 18/093,957

(22) Filed: Jan. 6, 2023

(65) Prior Publication Data

US 2023/0221821 A1    Jul. 13, 2023

(30) Foreign Application Priority Data

Jan. 11, 2022    (JP) .................................. 2022-002537

(51) Int. Cl.
*G06F 3/041*    (2006.01)
*G06F 3/044*    (2006.01)

(52) U.S. Cl.
CPC .......... *G06F 3/0416* (2013.01); *G06F 3/0418* (2013.01); *G06F 3/044* (2013.01); *G06F 3/04166* (2019.05); *G06F 3/0443* (2019.05); *G06F 2203/04101* (2013.01)

(58) Field of Classification Search
CPC ...... G06F 3/044; G06F 3/0416; G06F 3/0443; G06F 3/04166; G06F 3/0418; G06F 2203/04101; G01B 7/004
See application file for complete search history.

(56) References Cited

U.S. PATENT DOCUMENTS

| | | | |
|---|---|---|---|
| 9,323,353 B1 * | 4/2016 | Sivertsen | G06F 3/0418 |
| 9,576,549 B2 * | 2/2017 | Kida | G06F 3/0418 |
| 9,874,938 B2 * | 1/2018 | Murase | G06F 3/0304 |
| 11,520,426 B2 * | 12/2022 | Kurasawa | G06F 3/04186 |
| 2011/0084937 A1 * | 4/2011 | Chang | G01R 27/2605 345/174 |
| 2013/0201151 A1 * | 8/2013 | Takashima | G06F 3/0488 345/174 |
| 2013/0342498 A1 | 12/2013 | Kim et al. | |
| 2014/0049486 A1 | 2/2014 | Kim et al. | |
| 2014/0049508 A1 | 2/2014 | Kim et al. | |
| 2014/0347317 A1 * | 11/2014 | Tanaka | G06F 3/04184 345/174 |
| 2015/0301646 A1 * | 10/2015 | Caldwell | G06F 3/0418 345/174 |
| 2018/0081537 A1 * | 3/2018 | Jingushi | H04B 1/3827 |
| 2021/0397283 A1 * | 12/2021 | Huang | G06F 3/0412 |
| 2022/0129130 A1 * | 4/2022 | Van Ostrand | G06F 3/0393 |

* cited by examiner

*Primary Examiner* — Darlene M Ritchie

(74) *Attorney, Agent, or Firm* — K&L Gates LLP

(57) ABSTRACT

A detection device includes: a sensor having a detection region; electrodes arrayed in a first direction and a second direction in the detection region; a detection circuit configured to generate detection values of the electrodes based on detection signals from the electrodes; and a processing circuit configured to generate spatial coordinates indicating a position of an object to be detected on or above the detection region. The spatial coordinates include first data indicating a position in the first direction, second data indicating a position in the second direction, and third data indicating a position in a third direction. The processing circuit acquires the first to third data based on the detection values and generates the spatial coordinates when at least one of the detection values is equal to or larger than a first threshold and smaller than a second threshold larger than the first threshold.

8 Claims, 13 Drawing Sheets

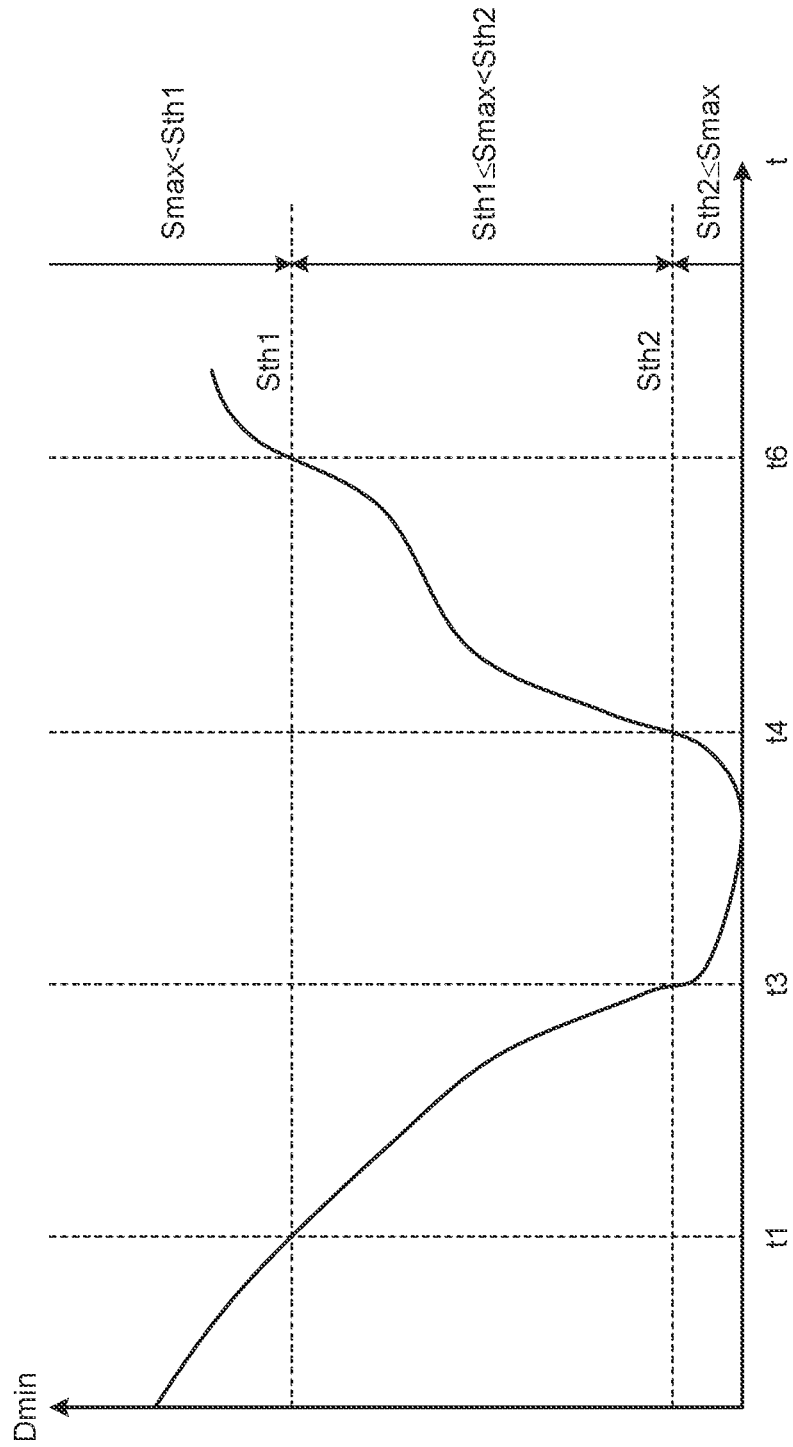

| Smax | Rx | Ry | Rz |
|---|---|---|---|
| Smax<Sth1 | - | - | - |
| Sth1≤Smax<Sth2 | ACQUIRED VALUE | ACQUIRED VALUE | ACQUIRED VALUE |
| Sth2≤Smax | STORED VALUE | STORED VALUE | 0 |

FIG.13

| Smax | Rx | Ry | Rz |
|---|---|---|---|
| Smax<Sth1 | - | - | - |
| Sth1≤Smax<Sth2 | ACQUIRED VALUE | ACQUIRED VALUE | ACQUIRED VALUE |
| Sth2≤Smax<Sth3 | STORED VALUE | STORED VALUE | ACQUIRED VALUE |
| Sth3≤Smax | STORED VALUE | STORED VALUE | 0 |

DETECTING DEVICE AND DETECTION SYSTEM USING DIFFERENT THRESHOLD LEVELS

CROSS REFERENCE

This application claims the benefit of priority from Japanese Patent Application No. 2022-002537 filed on Jan. 11, 2022, the entire contents of which are incorporated herein by reference.

BACKGROUND

1. Technical Field

What is disclosed herein relates to a detection device and a detection system.

2. Description of the Related Art

Recently known are detection systems, what are called touch panels, in which a detection device capable of detecting an external proximity object is mounted on or integrated with a display device, such as a liquid crystal display device (refer to the specification of US Patent Application Laid-open Publication No. 2014/0049486, the specification of US Patent Application Laid-open Publication No. 2013/0342498, and the specification of US Patent Application Laid-open Publication No. 2014/0049508, for example). In such detection systems, not only a touch detection function but also a hover detection function has been attracting attention. The touch detection function is a function to detect contact of an object to be detected, such as an operator's finger, with a detection surface. The hover detection function is a function to detect a proximity state, a gesture, and the like of the finger not in contact with the detection surface in a space on a detection region.

There is a configuration that is provided with a plurality of electrodes in the detection region and that detects capacitance generated in each of the electrodes to detect the spatial coordinates of the position where the object to be detected is present on or above the detection region. In this configuration, it is necessary to increase the size of each electrode and enhance sensitivity compared with a configuration that detects the plane coordinates of a touch detection position. When the distance between the detection surface and the object to be detected is too short in such a configuration, detection signals may possibly exceed the maximum value detectable by a detection circuit, thereby deteriorating the accuracy of acquiring the detection coordinates.

For the foregoing reasons, there is a need for a detection device and a detection system that can reduce a deterioration in accuracy of acquiring the proximity detection coordinates.

SUMMARY

According to an aspect, a detection device includes: a sensor having a detection region; a plurality of electrodes arrayed in a first direction and a second direction different from the first direction in the detection region; a detection circuit configured to generate detection values of the respective electrodes based on detection signals output from the electrodes; and a processing circuit configured to generate spatial coordinates indicating a position of an object to be detected on or above the detection region. The spatial coordinates include first data indicating a position in the first direction, second data indicating a position in the second direction, and third data indicating a position in a third direction orthogonal to the first direction and the second direction. The processing circuit is configured to use a first threshold for the detection value and a second threshold larger than the first threshold. The processing circuit is configured to acquire the first data, the second data, and the third data based on the detection values of the electrodes and generate the spatial coordinates including the first data, the second data, and the third data when at least one of the detection values of the respective electrodes is equal to or larger than the first threshold and smaller than the second threshold.

According to an aspect, a detection system includes the detection device and a display panel disposed facing the sensor with an air gap interposed therebetween. The detection region and a display region of the display panel overlap in plan view when viewed in the third direction.

BRIEF DESCRIPTION OF THE DRAWINGS

FIG. 8 is a conceptual chart illustrating an exemplary operation of the detection device according to the first embodiment;

FIG. 13 is a table of the correspondence of the spatial coordinates extracted by the detection device according to the second embodiment.

DETAILED DESCRIPTION

Figure 1:
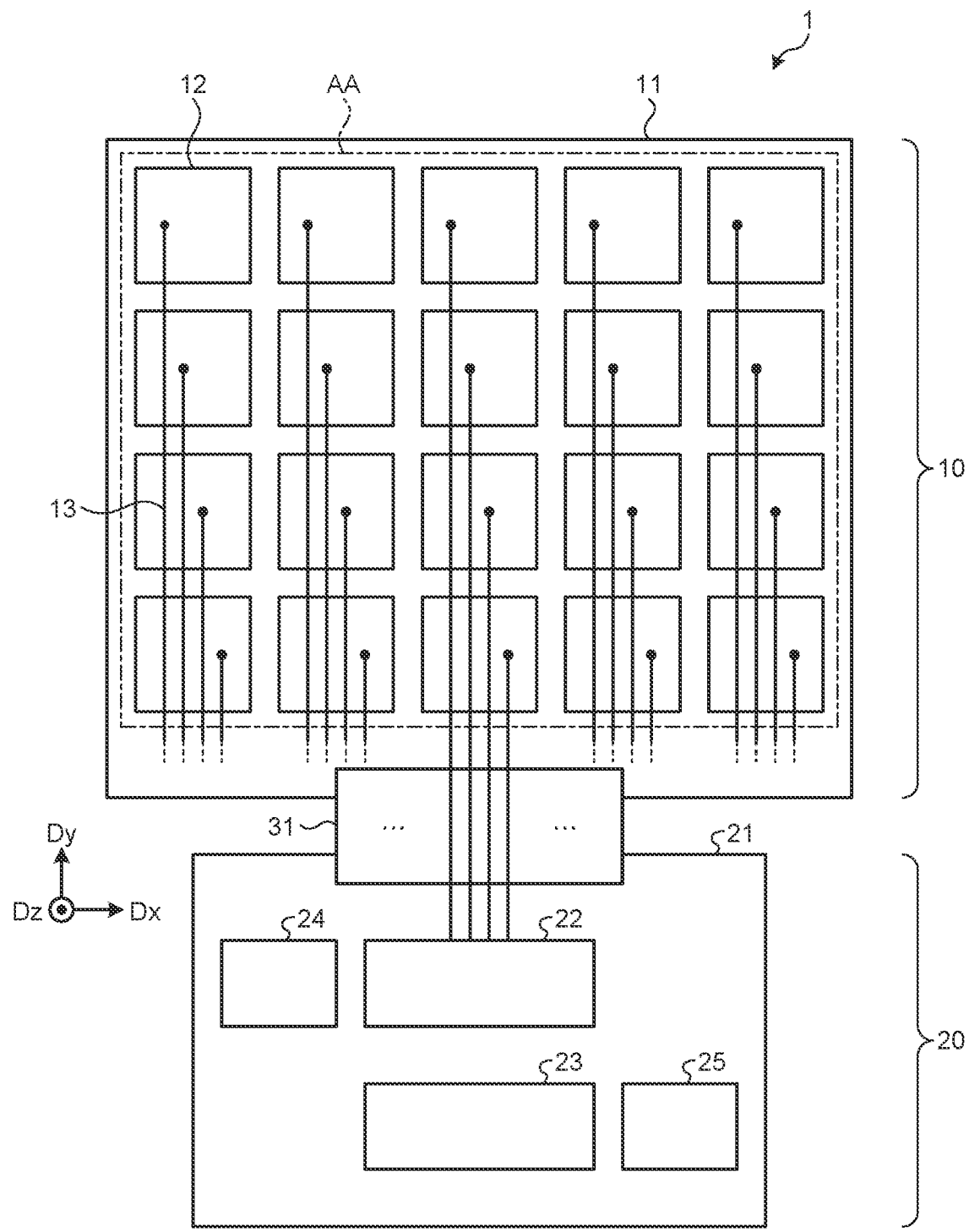
FIG. 1 is a plan view of a schematic configuration of a detection device used in a detection system according to a first embodiment.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present invention. To simplify the explanation, the drawings may possibly illustrate the width, the thickness, the shape, and other elements of each unit more schematically than those in the actual aspect. These elements, however, are given by way of example only and are not intended to limit interpretation of the present invention. In the present specification and the drawings, components similar to those previously described with reference to previous drawings are denoted by the same reference numerals, and detailed explanation thereof may be appropriately omitted.

In this disclosure, when an element is described as being "on" another element, the element can be directly on the other element, or there can be one or more elements between the element and the other element.

First Embodiment

FIG. 1 is a plan view of a schematic configuration of a detection device used in a detection system according to a first embodiment. As illustrated in FIG. 1, a detection device 1 includes a sensor 10 and a controller (control circuit) 20.

The sensor 10 includes a sensor substrate 11, a plurality of electrodes 12, and wiring lines 13. The electrodes 12 are provided in a detection region AA of the sensor substrate 11. The wiring lines 13 extend from the respective electrodes 12. The controller 20 includes a control substrate 21, a detection circuit 22, a processing circuit 23, a power circuit 24, and an interface circuit 25.

The detection region AA of the sensor substrate 11 is a region provided with the electrodes 12 arrayed in a matrix (row-column configuration) in a Dx direction (first direction) and a Dy direction (second direction). The sensor substrate 11 is a glass substrate or light-transmitting flexible printed circuits (FPC), for example.

In the present disclosure, the Dx direction (first direction) and the Dy direction (second direction) are orthogonal to each other in the detection region AA of the sensor substrate 11. In the present disclosure, the direction orthogonal to the Dx direction (first direction) and the Dy direction (second direction) is a Dz direction (third direction).

In the example illustrated in FIG. 1, five electrodes 12 are arrayed in the Dx direction, and four electrodes 12 are arrayed in the Dy direction, that is, 5×4 (=20) electrodes 12 are provided. The number of electrodes 12 provided in the detection region AA of the sensor substrate 11 is not limited thereto.

The control substrate 21 is electrically coupled to the sensor substrate 11 via a wiring substrate 31. The wiring substrate 31 is flexible printed circuits, for example. Each electrode 12 of the sensor 10 is coupled to the detection circuit 22 of the controller 20 via the wiring substrate 31.

The control substrate 21 is provided with the detection circuit 22, the processing circuit 23, the power circuit 24, and the interface circuit 25. The control substrate 21 is a rigid board, for example.

The detection circuit 22 generates a detection value of each electrode 12 based on a detection signal of each electrode 12 output from the sensor substrate 11. The detection circuit 22 is an analog front end (AFE) IC, for example.

The processing circuit 23 generates the spatial coordinates indicating the position where an object to be detected (e.g., an operator's finger) is present on the detection region AA based on the detection value of each of the electrode 12 that is output from the detection circuit 22. The processing circuit 23 may be a programmable logic device (PLD), such as a field programmable gate array (FPGA), or a micro control unit (MCU), for example.

The power circuit 24 is a circuit that supplies electric power to the detection circuit 22 and the processing circuit 23.

The interface circuit 25 is a USB controller IC, for example, and is a circuit that controls communications between the processing circuit 23 and a host controller (not illustrated) of a host device on which the detection system is mounted.

Figure 2:
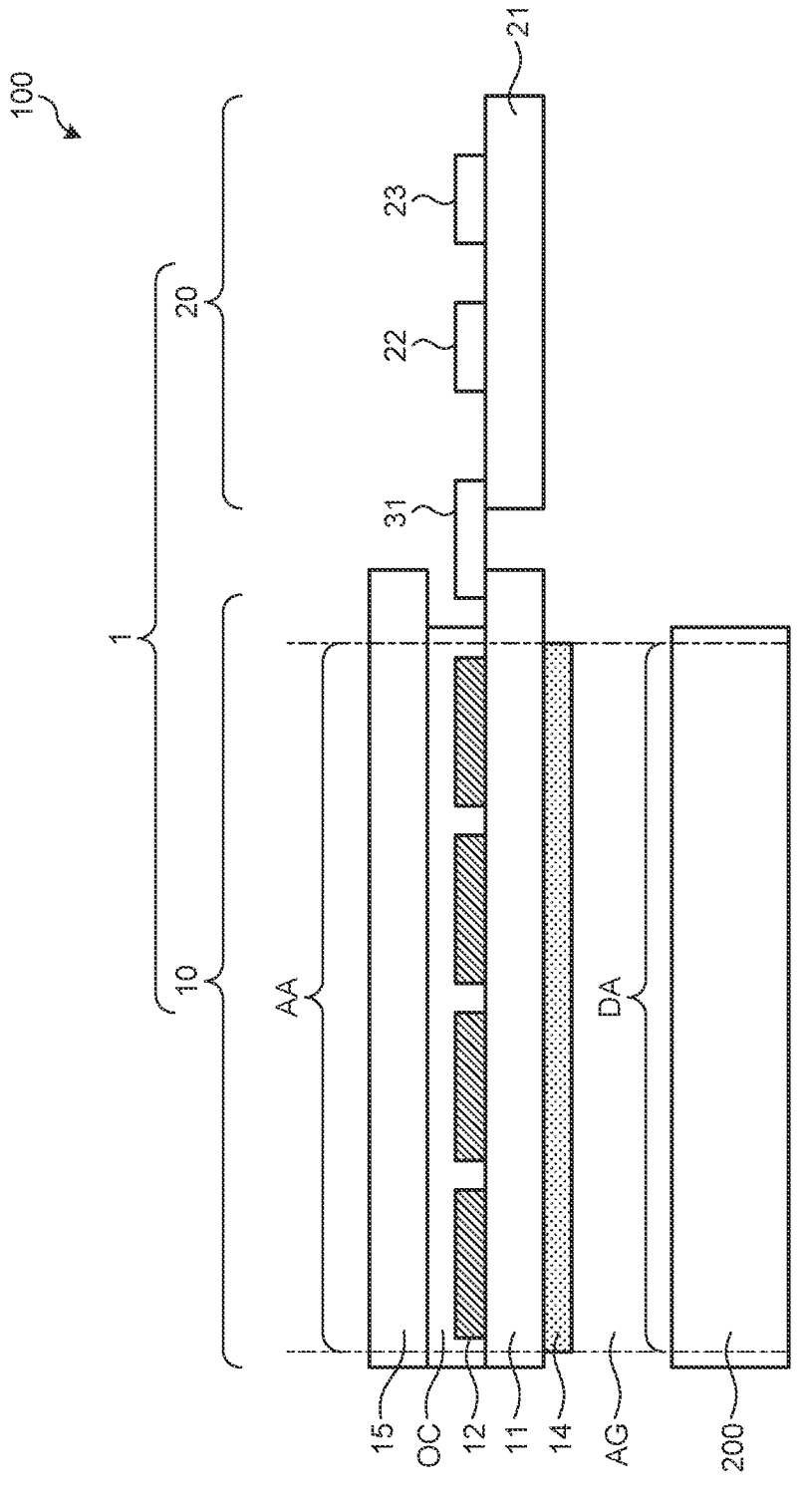
FIG. 2 is a schematic view of a schematic sectional configuration of the detection system according to the first embodiment.

FIG. 2 is a schematic view of a schematic sectional configuration of the detection system according to the first embodiment.

A detection system 100 according to the first embodiment includes the detection device 1 and a display panel 200. The display panel 200 is disposed facing the sensor 10 of the detection device 1 with an air gap AG interposed therebetween. The sensor 10 of the detection device 1 is disposed such that the detection region AA of the sensor 10 and a display region DA of the display panel 200 overlap in plan view when viewed in the Dz direction (third direction). The display panel 200 is a liquid crystal display (LCD), for example. The display panel 200 may be an organic EL display (organic light-emitting diode (OLED)) or an inorganic EL display (a micro LED or a mini LED), for example.

The sensor 10 includes the sensor substrate 11, the electrodes 12, a shield 14, and a cover glass 15. The sensor 10 is composed of the shield 14, the sensor substrate 11, the electrodes 12, and the cover glass 15 stacked in this order on the display panel 200. In the following description, the surface of the cover glass 15 provided as the top layer is also referred to as a "detection surface".

The shield 14 is provided on a first surface of the sensor substrate 11 facing the display panel 200. The electrodes 12 are provided on a second surface of the sensor substrate 11 opposite to the first surface. The cover glass 15 is provided on the second surface of the sensor substrate 11 with an adhesive layer OC interposed therebetween. The adhesive layer OC is preferably made of light-transmitting adhesive. The adhesive layer OC may be made of a light-transmitting double-sided adhesive film, such as optical clear adhesive (OCA).

Figure 3:
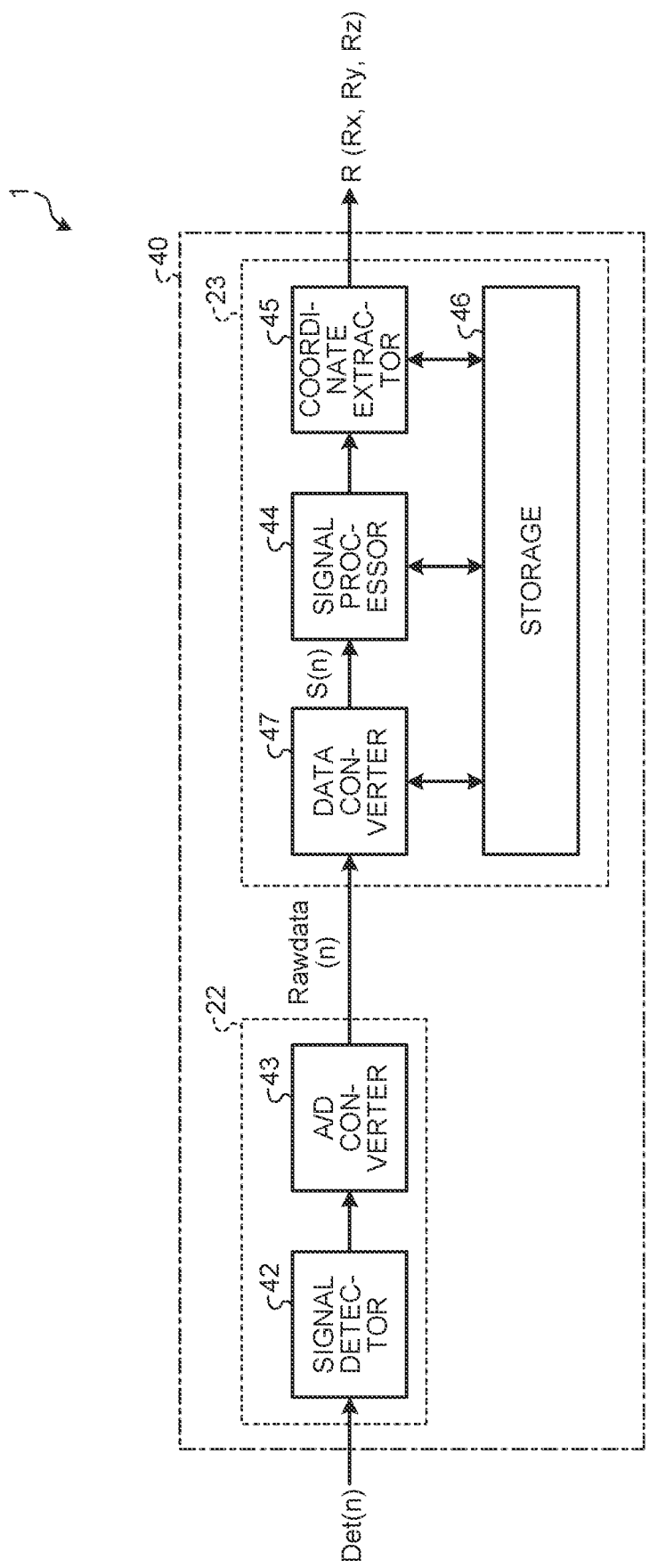
FIG. 3 is a block diagram of an exemplary configuration of a detector of the detection device according to the first embodiment.

FIG. 3 is a block diagram of an exemplary configuration of a detector of the detection device according to the first embodiment.

As illustrated in FIG. 3, a detector (detection circuit) 40 includes a signal detector (signal detection circuit) 42, an analog-to-digital converter (A/D converter) 43, a signal processor (signal processing circuit) 44, a coordinate extractor (coordinate extraction circuit) 45, a storage (storage circuit) 46, and a data converter (data conversion circuit) 47. The signal detector 42 and the A/D converter 43 are included in the detection circuit 22. The signal processor 44, the coordinate extractor 45, the storage 46, and the data converter 47 are included in the processing circuit 23.

The signal detector 42 generates an output value Rawdata (n) of each electrode 12 based on a detection signal Det(n) (n is a natural number from 1 to N, where N is the number of electrodes in the detection region AA) of each electrode 12 output from the sensor substrate 11. The A/D converter 43 converts the output value of each electrode 12 into a digital signal by sampling the output value.

The data converter 47 performs linear conversion on the output value Rawdata(n) of each electrode 12 and outputs the value resulting from the conversion as a detection value S(n) of each electrode 12.

The signal processor 44 performs predetermined signal processing on the detection value S(n) of each electrode 12. Specifically, the signal processor 44 performs comparative arithmetic processing on the detection value S(n) of each electrode 12.

The coordinate extractor 45 extracts the spatial coordinates of the position where the object to be detected is present based on the results of the comparative arithmetic processing performed by the signal processor 44.

The storage 46 stores therein a first threshold Sth1 and a second threshold Sth2 that are used in the comparative arithmetic processing performed by the signal processor 44. The storage 46 also has a function of storing therein the spatial coordinates extracted by the coordinate extractor 45.

Figure 4A:
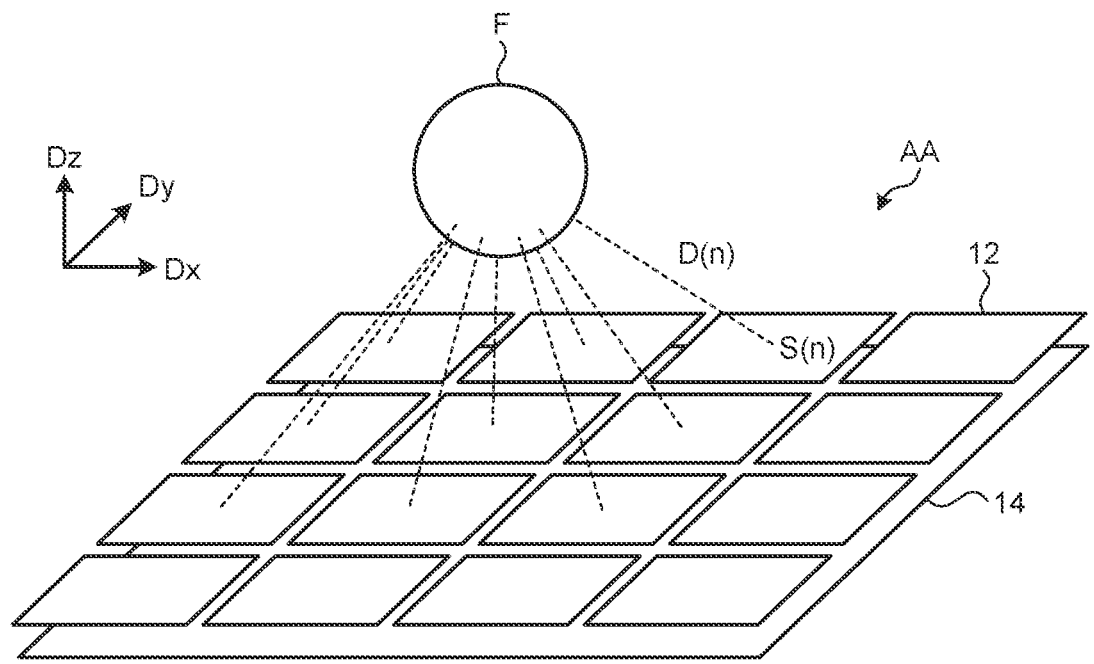
FIG. 4A is a schematic view illustrating the positional relation between the position of an object to be detected in a space on a detection region and each electrode.
Figure 4B:
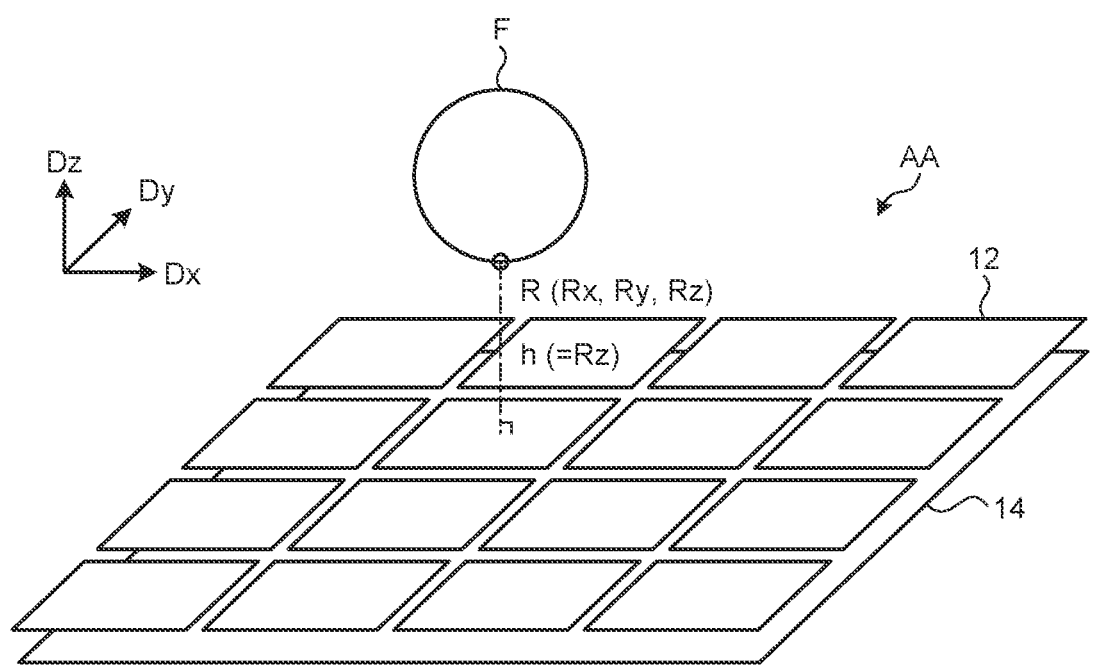
FIG. 4B is a schematic view illustrating the spatial coordinates of the object to be detected in the space on the detection region.

FIG. 4A is a schematic view illustrating the positional relation between the position of the object to be detected in a space on the detection region and each electrode. FIG. 4B is a schematic view illustrating the spatial coordinates of the object to be detected in the space on the detection region. FIGS. 4A and 4B illustrate an example where an object to be detected F is present in the space on the detection region AA.

As illustrated in FIG. 4A, each electrode 12 in the detection region AA has capacitance generated corresponding to a distance D(n) between the object to be detected F in the space on the detection region AA and the electrode 12. The output value Rawdata(n) corresponding to the capacitance is acquired by the detection circuit 22.

The processing circuit 23 extracts spatial coordinates R (Rx,Ry,Rz) indicating the position of the object to be detected F in the space on the detection region AA illustrated in FIG. 4B using the output value Rawdata(n) of each electrode 12 generated by the detection circuit 22.

In the present disclosure, the spatial coordinates R (Rx, Ry,Rz) include first data Rx indicating the position in the Dx direction (first direction) on the detection region AA, second data Ry indicating the position in the Dy direction (second direction) on the detection region AA, and third data Rz indicating the position in the Dz direction (third direction) orthogonal to the Dx direction (first direction) and the Dy direction (second direction).

In the present disclosure, the spatial coordinates R (Rx, Ry,Rz) indicate the position of the object to be detected F in the space on the surface of the cover glass 15 serving as the detection surface.

As described above, the detection device 1 according to the present disclosure is configured to detect the spatial coordinates of the position where the object to be detected F is present on the detection region AA by detecting the capacitance generated in each electrode 12. To detect the object to be detected F present at a position away from the detection region AA in the Dz direction, it is necessary to enhance sensitivity of each electrode 12 by increasing the size of the electrode 12 compared with a configuration that detects the plane coordinates of the contact position of the object to be detected F with the detection surface. In the present disclosure, the size of each electrode 12 is assumed to be approximately 20×20 mm$^2$ to 40×40 mm$^2$, for example.

Figure 5A:
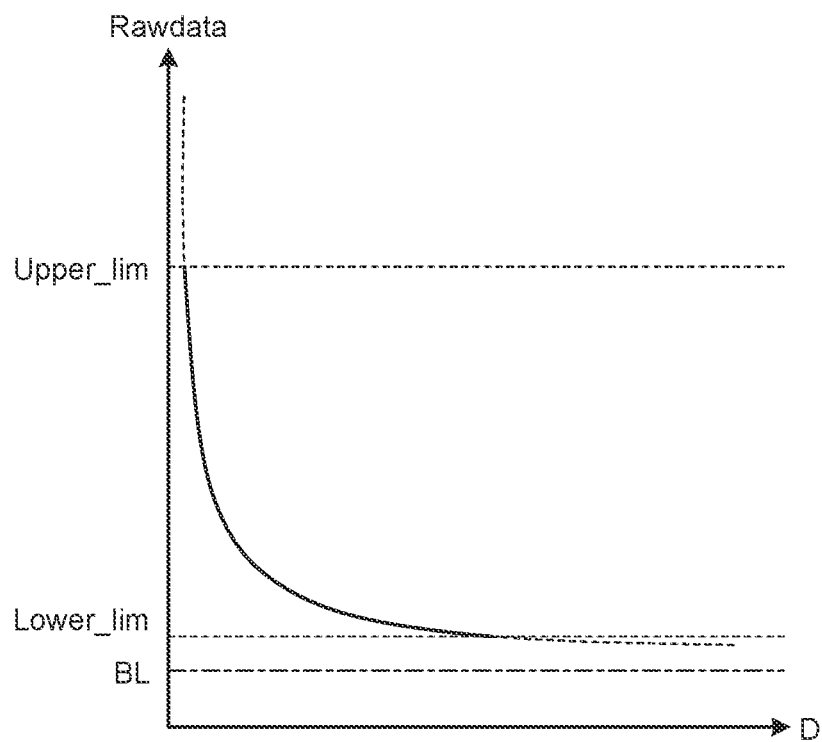
FIG. 5A is a graph illustrating a first example of the relation between an output value and the distance between the object to be detected and the electrode.
Figure 5B:
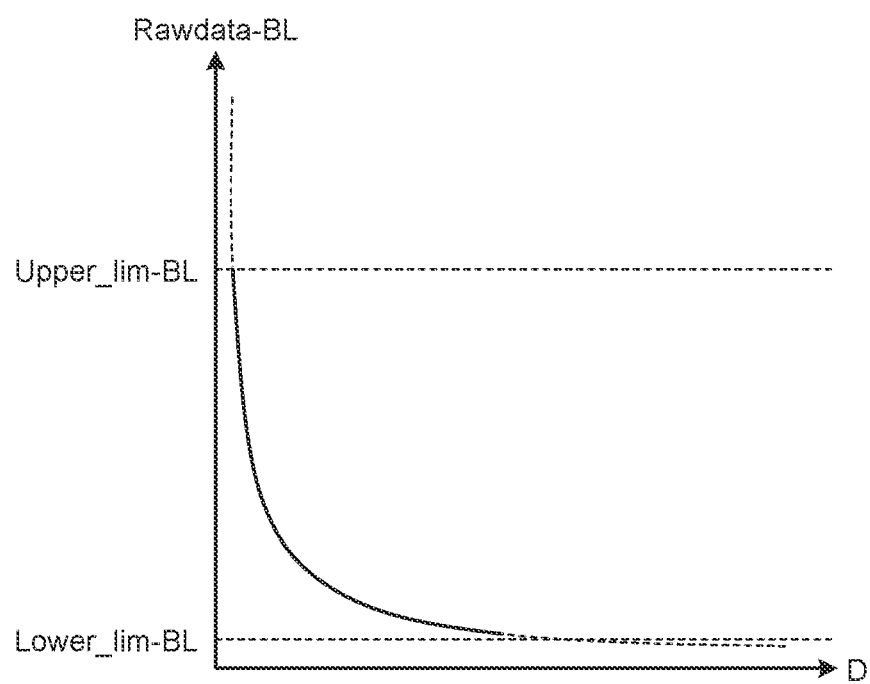
FIG. 5B is a graph illustrating a second example of the relation between the output value and the distance between the object to be detected and the electrode.

FIG. 5A is a graph illustrating a first example of the relation between the output value and the distance between the object to be detected and the electrode. FIG. 5B is a graph illustrating a second example of the relation between the output value and the distance between the object to be detected and the electrode. In FIG. 5A, the horizontal axis indicates the distance D between the object to be detected F and the electrode 12, and the vertical axis indicates the output value Rawdata. In FIG. 5A, BL in the vertical axis indicates the output value when the distance D between the object to be detected F and the electrode 12 is infinite. The vertical axis in FIG. 5B indicates the difference (Rawdata—BL) between the output value Rawdata and BL.

As illustrated in FIG. 5A, the ratio of decrease in the output value Rawdata decreases as the distance D between the object to be detected F and the electrode 12 increases. In other words, the ratio of change in the output value Rawdata decreases as the distance D between the object to be detected F and the electrode 12 increases. Therefore, the accuracy of detecting the distance D between the object to be detected F and the electrode 12 is low in a region where the output value Rawdata is equal to or smaller than a certain value. Specifically, the accuracy of detecting the distance D between the object to be detected F and the electrode 12 fails to be secured in a region where the output value Rawdata is smaller than a lower limit Lower_lim illustrated in FIG. 5A.

As illustrated in FIG. 5A, the ratio of increase in the output value Rawdata increases exponentially as the distance D between the object to be detected F and the electrode 12 decreases. In other words, the ratio of change in the output value Rawdata increases sharply as the distance D between the object to be detected F and the electrode 12 decreases. Therefore, the accuracy of detecting the distance D between the object to be detected F and the electrode 12 is low in a region where the output value Rawdata is equal to or larger than a certain value. In particular, the size of each electrode 12 is large in the detection device 1 according to the present disclosure. When the object to be detected F is present at a position in proximity to or in contact with the detection surface, the amount of change in the output value Rawdata is large compared with the amount of change in the distance D between the object to be detected F and the electrode 12. Specifically, the accuracy of detecting the distance D between the object to be detected F and the electrode 12 fails to be secured in a region where the output value Rawdata is larger than an upper limit Upper_lim illustrated in FIG. 5A.

In the present disclosure, the output value Rawdata is linearly converted in the region greater than or equal to the lower limit Lower_lim but not greater than the upper limit Upper_lim illustrated in FIG. 5A. Specifically, the data converter 47 of the processing circuit 23 calculates the difference (Rawdata—BL) between the output value Rawdata and BL illustrated in FIG. 5A (refer to FIG. 5B) and performs linear conversion on the difference (Rawdata—BL).

Figure 6:
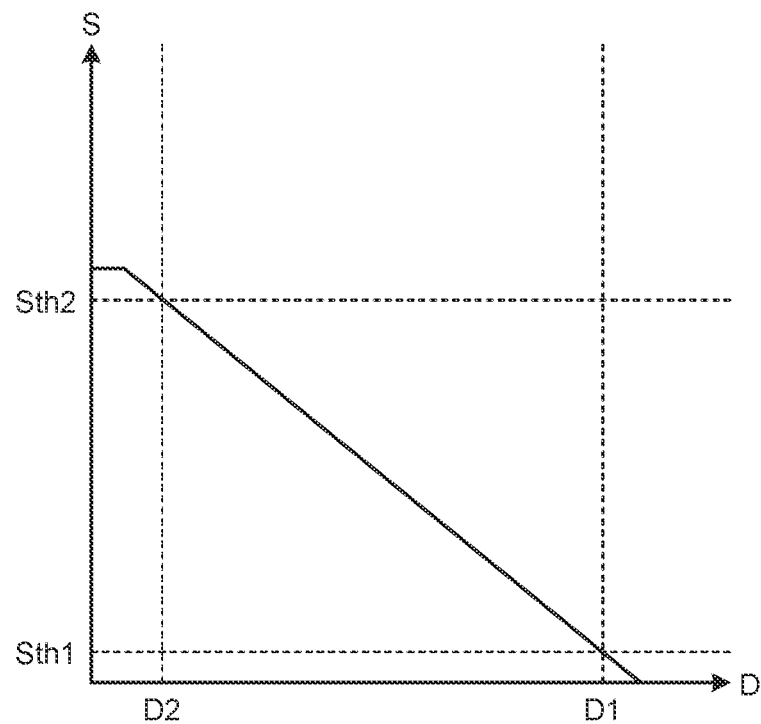
FIG. 6 is a graph illustrating the relation between a detection value resulting from linear conversion and the distance between the object to be detected and the electrode according to the first embodiment.

FIG. 6 is a graph illustrating the relation between the detection value resulting from linear conversion and the distance between the object to be detected and the electrode according to the first embodiment. In FIG. 6, the horizontal axis indicates the distance D between the object to be detected F and the electrode 12, and the vertical axis indicates the detection value S resulting from linear conversion. The output value BL when the distance D between the object to be detected F and the electrode 12 is infinite is stored in the storage 46, for example.

The processing circuit 23 acquires the spatial coordinates indicating the position of the object to be detected F in the region larger than or equal to the first threshold Sth1 but smaller than the second threshold Sth2 (Sth1≤S<Sth2) illustrated in FIG. 6. With this configuration, the detection device 1 can secure high accuracy of extracting the spatial coordinates indicating the position of the object to be detected F in the space on the detection region AA.

Figure 7A:
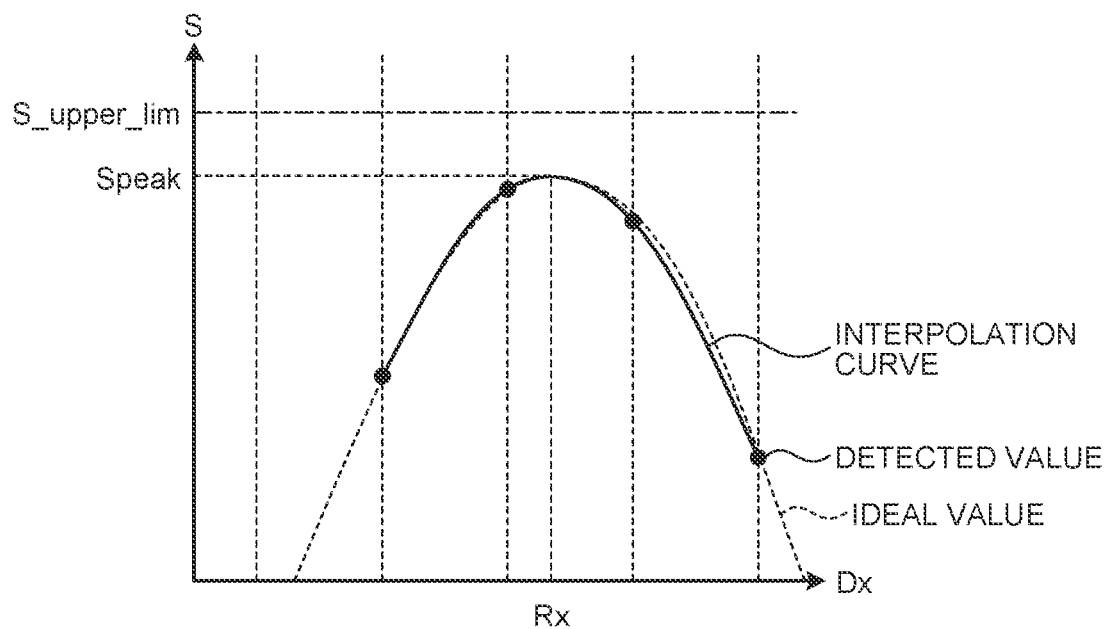
FIG. 7A is a first graph illustrating an example of a method for extracting the spatial coordinates of the object to be detected.

FIG. 7A is a first graph illustrating an example of a method for extracting the spatial coordinates of the object to be detected. In FIG. 7A, the horizontal axis indicates the position in the Dx direction in the detection region AA (corresponding to the first data Rx of the spatial coordinates R (Rx,Ry,Rz)), and the vertical axis indicates the signal value corresponding to the detection value S(n) of each electrode 12. FIG. 7A illustrates an example where the object to be detected F is present in a space satisfying Sth1≤S<Sth2.

The calculated value represented by the solid line in FIG. 7A is obtained by interpolation using the detection value S(n) of each electrode 12, for example. The method for calculating the calculated value illustrated in FIG. 7A is not limited to interpolation and may be approximation, for example.

The processing circuit 23 extracts the spatial coordinates R (Rx,Ry,Rz) at which the calculated value is the maximum value Speak illustrated in FIG. 7A. The third data Rz indicating the position in the Dz direction can be calculated as a value proportional to the maximum value Speak of the calculated value, for example.

The method for extracting the spatial coordinates R (Rx,Ry,Rz) of the object to be detected F is not limited to the method described above. The present disclosure is not limited by the method for extracting the spatial coordinates R (Rx,Ry,Rz) of the object to be detected F.

Figure 7B:
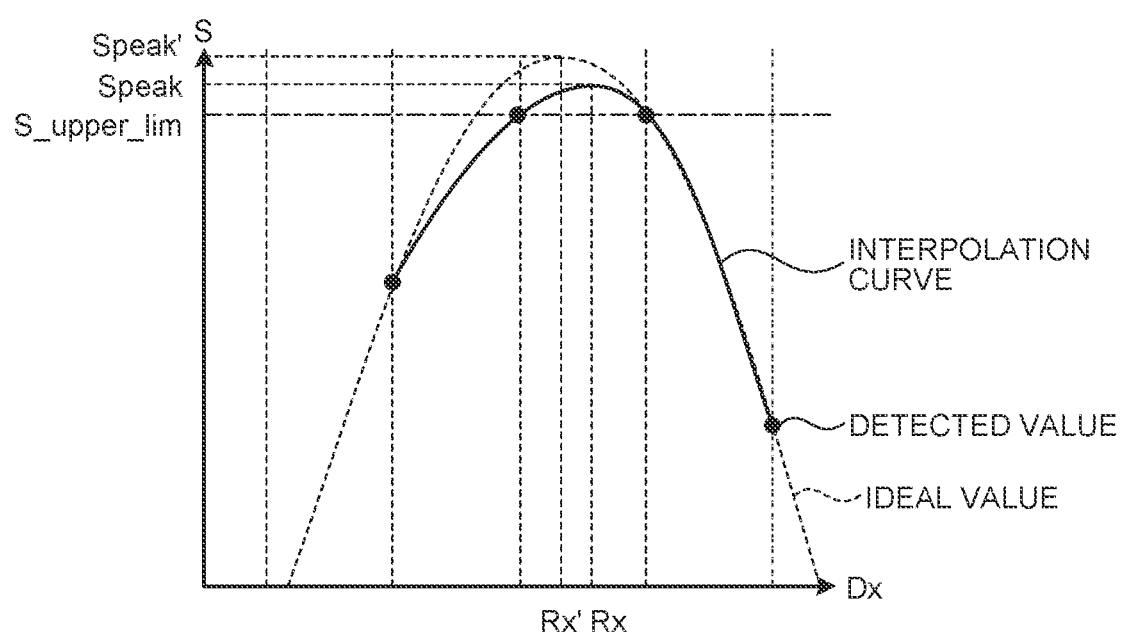
FIG. 7B is a second graph illustrating an example of the method for extracting the spatial coordinates of the object to be detected.

FIG. 7B is a second graph illustrating an example of the method for extracting the spatial coordinates of the object to be detected. FIG. 7B illustrates an example where the object to be detected F is present at a position in proximity to or in contact with the detection surface (D<D2, refer to FIG. 6), and the result of processing by the detector 40 is equal to or larger than a processing upper limit S_upper_lim. In this case, as illustrated in FIG. 7B, the calculated value represented by the solid line has an error and deviates from an ideal value represented by the dashed line near the position where the object to be detected F is present. As a result, the accuracy of detecting the coordinates of the object to be detected F may possibly be lowered. In the example illustrated in FIG. 7B, the first data Rx corresponding to the calculated value deviates from Rx' obtained by the ideal value. The third data Rz corresponding to the maximum value Speak of the calculated value also deviates from the ideal value.

The following describes a specific example of a spatial coordinate detection operation performed by the detection device 1 according to the first embodiment.

Figures 9, 10:
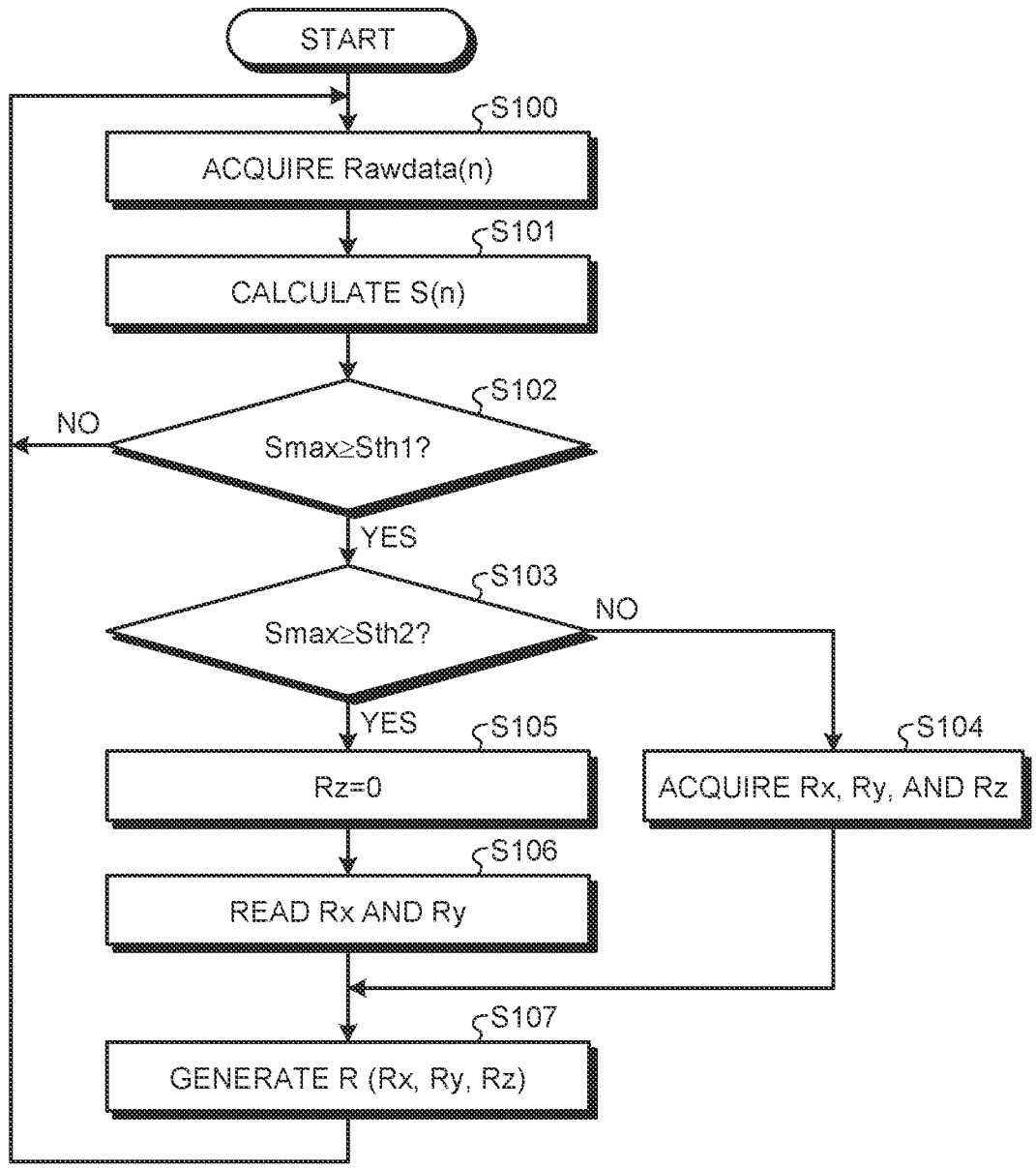
FIG. 9 is a table of the correspondence of the spatial coordinates extracted by the detection device according to the first embodiment.
FIG. 10 is a flowchart of an example of spatial coordinate detection performed by the detection device according to the first embodiment.

FIG. 8 is a conceptual chart illustrating an exemplary operation of the detection device according to the first embodiment. FIG. 9 is a table of the correspondence of the spatial coordinates extracted by the detection device according to the first embodiment. FIG. 10 is a flowchart of an example of spatial coordinate detection performed by the detection device according to the first embodiment.

In the exemplary operation illustrated in FIG. 8, the horizontal axis indicates time, and the vertical axis indicates the minimum distance Dmin of the distances D(n) between the object to be detected F and the respective electrodes 12. Smax indicates the maximum detection value of the detection values S(n) of the respective electrodes 12 in the detection region AA.

The detection circuit 22 acquires the output value Rawdata(n) of each electrode 12 based on the detection signal Det(n) output from each electrode 12 (Step S100).

The data converter 47 of the processing circuit 23 calculates the detection value S(n) of each electrode 12 by performing linear conversion on the output value Rawdata(n) of each electrode 12 (Step S101). The signal processor 44 determines whether or not the maximum detection value Smax of the detection values S(n) of the respective electrodes 12 output from the data converter 47 is equal to or larger than the first threshold Sth1 (Smax≥Sth1) (Step S102).

When the maximum detection value Smax is smaller than the first threshold Sth1 (Smax<Sth1) (No at Step S102), the process is returned to Step S100. In other words, in the detection device 1, the period before time t1 and the period after time t6 in FIG. 8 in each of which the maximum detection value Smax is smaller than the first threshold Sth1 (Smax<Sth1), are each considered as a period in which the object to be detected F is not present in the space where the coordinates can be detected. Thus, in the periods, the detection device 1 does not perform the extraction of the coordinates of the object to be detected F.

When the maximum detection value Smax is equal to or larger than the first threshold Sth1 (Smax≥Sth1) (Yes at Step S102), the signal processor 44 of the processing circuit 23 determines whether or not the maximum detection value Smax is equal to or larger than the second threshold Sth2 (Smax≥Sth2) (Step S103).

When the maximum detection value Smax is smaller than the second threshold Sth2 (Smax<Sth2) (No at Step S103), that is, in the period from time t1 to time t3 and the period from time t4 to time t6 in FIG. 8 in which the maximum detection value Smax is equal to or larger than the first threshold Sth1 and smaller than the second threshold Sth2 (Sth1≤Smax<Sth2), the coordinate extractor 45 of the processing circuit 23 performs processing at Step S104 and processing at Step S107. That is, the coordinate extractor 45 of the processing circuit 23 acquires the first data Rx, the second data Ry, and the third data Rz indicating the position of the object to be detected F in the space on the detection region AA using the detection value S(n) of each electrode 12 and stores them in the storage 46 (Step S104). The coordinate extractor 45 generates the spatial coordinates R (Rx,Ry,Rz) including the first data Rx, the second data Ry, and the third data Rz (Step S107).

When the maximum detection value Smax is equal to or larger than the second threshold Sth2 (Smax≥Sth2) (Yes at Step S103), that is, in the period from time t3 to time t4 in FIG. 8, the coordinate extractor 45 of the processing circuit 23 performs processing at Step S105, processing at Step S106, and processing at Step S107. That is, the coordinate extractor 45 of the processing circuit 23 sets the third data Rz indicating the position of the object to be detected F in the third direction stored in the storage 46 to "0" (Step S105). The coordinate extractor 45 reads the first data Rx and the second data Ry stored in the storage 46 (Step S106) and generates the spatial coordinates R (Rx,Ry,0) (Step S107).

In the spatial coordinate detection described above, when the maximum detection value Smax is equal to or larger than the first threshold Sth1 and smaller than the second threshold Sth2 (Sth1≤Smax<Sth2), the detection device 1 generates the spatial coordinates R (Rx,Ry,Rz) including the first data Rx, the second data Ry, and the third data Rz acquired using the detection value S(n) of each electrode 12.

When the maximum detection value Smax is equal to or larger than the second threshold Sth2 (Smax≥Sth2), the detection device 1 generates the spatial coordinates R (Rx, Ry,0) by using the first data Rx and the second data Ry stored in the storage 46 and setting the third data Rz to "0".

Thus, the detection device 1 can reduce a deterioration in accuracy of acquiring the proximity detection coordinates when the object to be detected F comes into proximity to or contact with the detection surface.

While the maximum detection value Smax of the detection values S(n) of the respective electrodes 12 in the detection region AA is used for threshold determination in the spatial coordinate detection described above, the present embodiment is not limited thereto.

The detection device 1 may generate the spatial coordinates R (Rx,Ry,Rz) including the first data Rx, the second data Ry, and the third data Rz acquired using the detection value S(n) of each electrode 12, when at least one of the detection values S(n) of the respective electrodes 12 in the detection region AA is equal to or larger than the first threshold Sth1 and smaller than the second threshold Sth2, for example.

The detection device 1 may generate the spatial coordinates R (Rx,Ry,0) by using the first data Rx and the second data Ry stored in the storage 46 and setting the third data Rz to "0", when at least one of the detection values S(n) of the respective electrodes 12 in the detection region AA is equal to or larger than the second threshold Sth2, for example.

Second Embodiment

Figure 11:
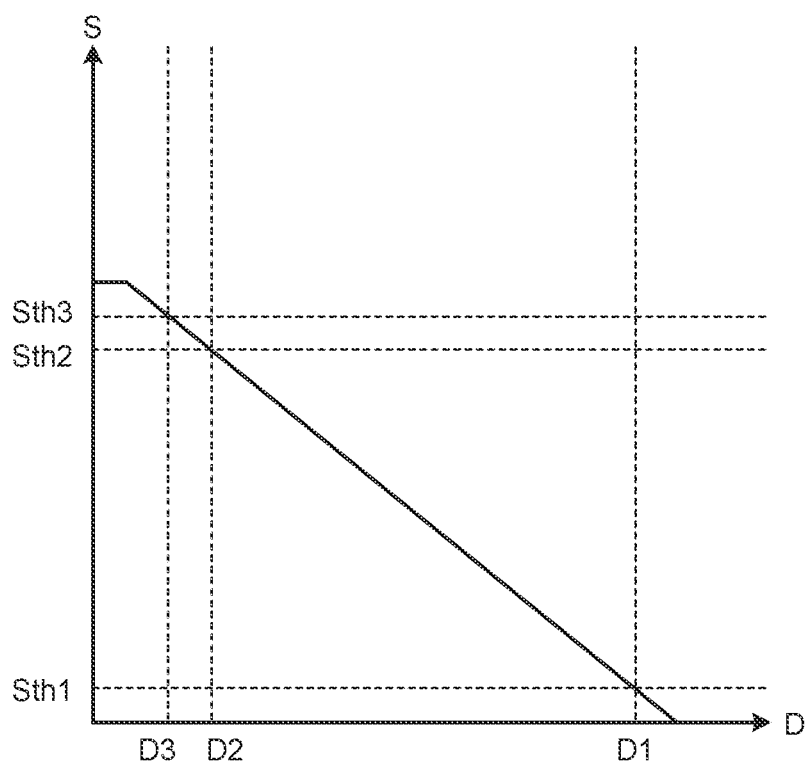
FIG. 11 is a graph illustrating the relation between the detection value resulting from linear conversion and the distance between the object to be detected and the electrode according to a second embodiment.

FIG. 11 is a graph illustrating the relation between the detection value resulting from linear conversion and the distance between the object to be detected and the electrode according to a second embodiment. The configuration of the detector 40 in the detection device 1 is not described herein in detail because it is the same as that according to the first embodiment. A third threshold Sth3 according to the second embodiment corresponds to the second threshold Sth2 according to the first embodiment.

If the size of each electrode 12 is large (e.g., 40×40 mm$^2$), the detection accuracy in the Dx and Dy directions may possibly decrease.

As illustrated in FIG. 11, the second embodiment uses the second threshold Sth2 and the third threshold Sth3 larger than the second threshold Sth2. When the maximum detection value Smax of the electrodes 12 is equal to or larger than the second threshold Sth2 and smaller than the third threshold Sth3, the detection device 1 generates the spatial coordinates R (Rx,Ry,Rz) by acquiring the third data Rz indicating the position of the object to be detected F in the third direction in the space on the detection region AA and using the first data Rx and the second data Ry stored in the storage 46. The following describes this aspect.

Figure 12:
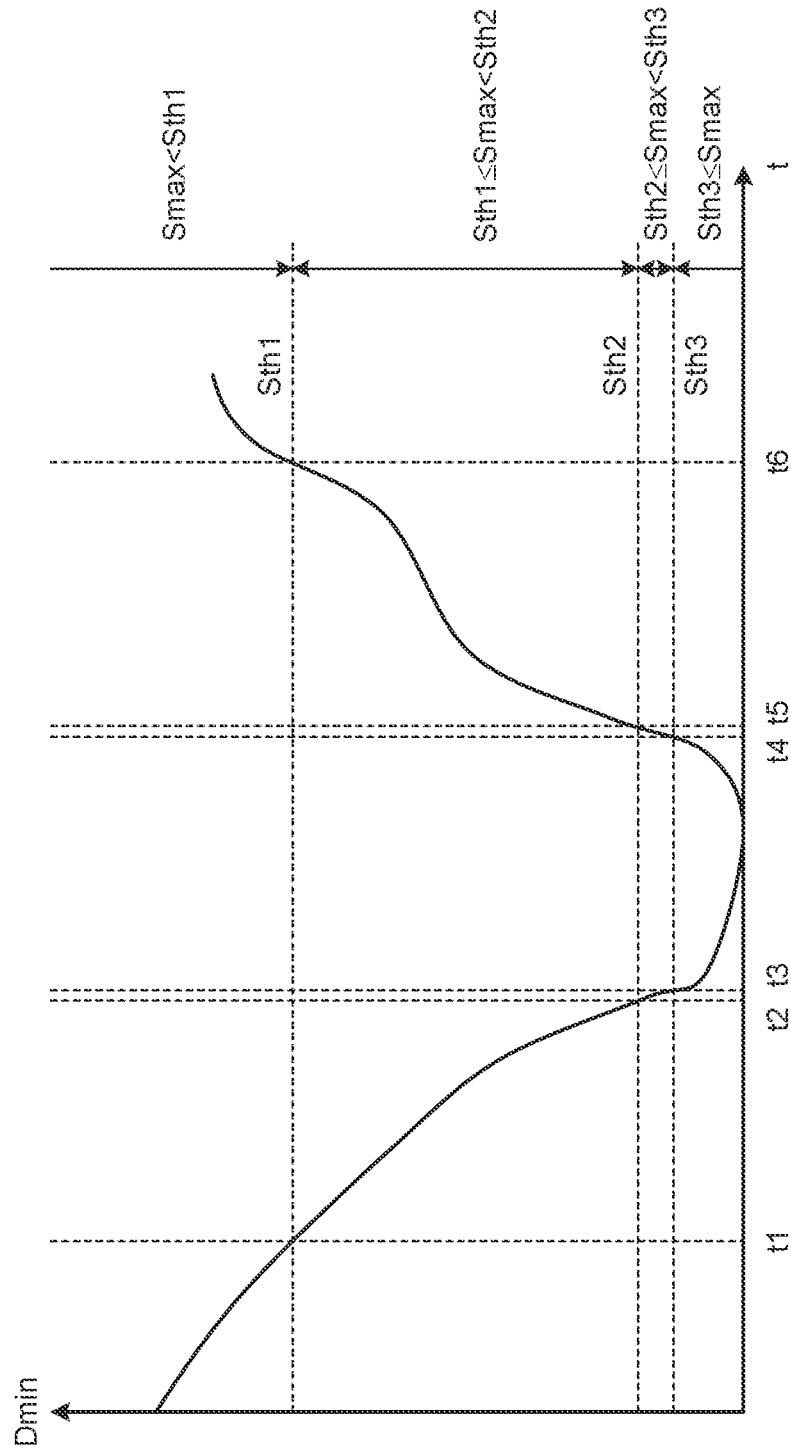
FIG. 12 is a conceptual chart illustrating an exemplary operation of the detection device according to the second embodiment.
Figure 14:
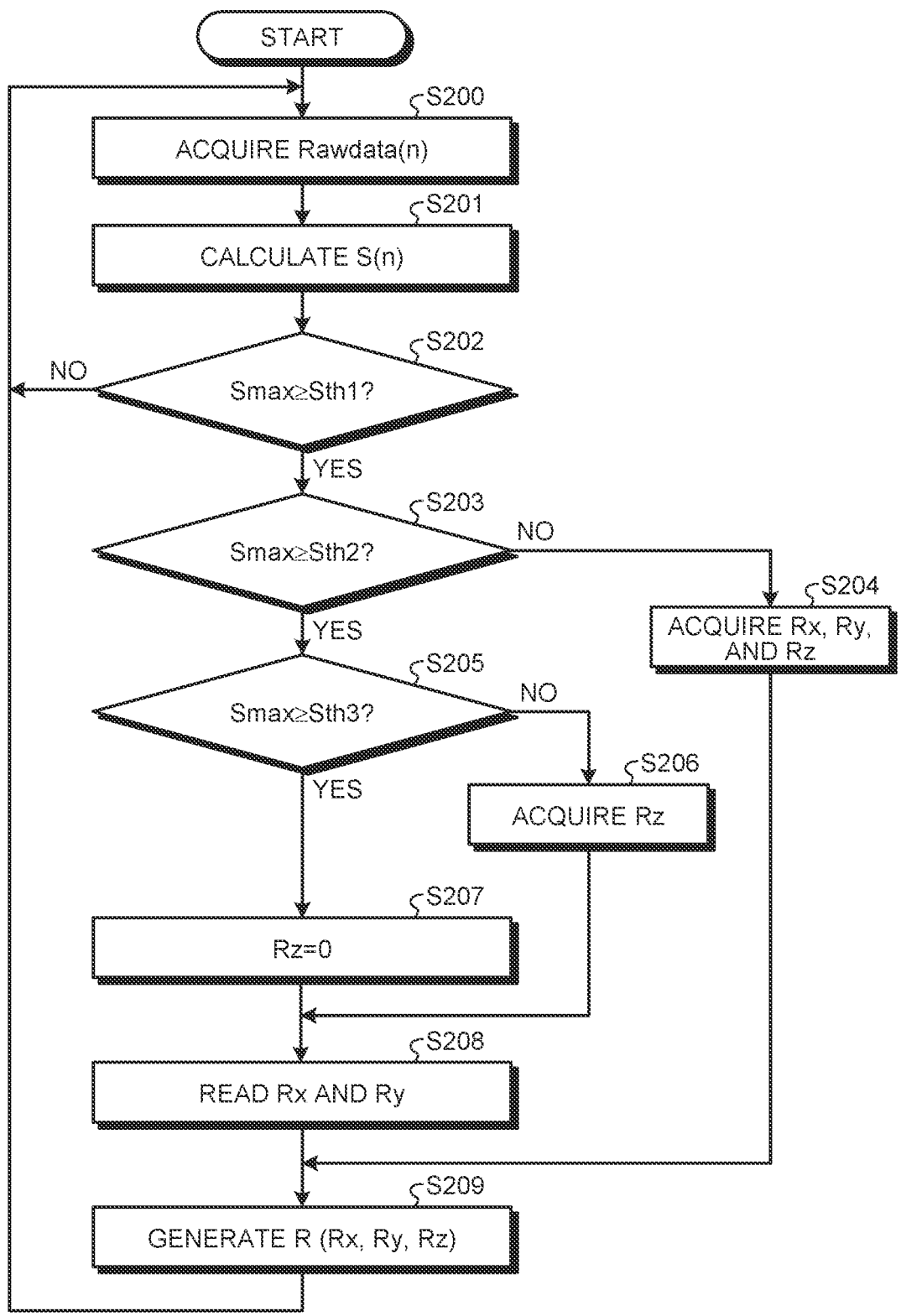
FIG. 14 is a flowchart of an example of spatial coordinate detection performed by the detection device according to the second embodiment.

FIG. 12 is a conceptual chart illustrating an exemplary operation of the detection device according to the second embodiment. FIG. 13 is a table of the correspondence of the spatial coordinates extracted by the detection device according to the second embodiment. FIG. 14 is a flowchart of an example of spatial coordinate detection performed by the detection device according to the second embodiment.

The detection circuit 22 acquires the output value Rawdata(n) of each electrode 12 based on a detection signal Det(n) output from each electrode 12 (Step S200).

The data converter 47 of the processing circuit 23 performs linear conversion on the output value Rawdata(n) of each electrode 12 and calculates the detection value S(n) of each electrode 12 (step S201). The signal processor 44 determines whether or not the maximum detection value Smax of the detection values S(n) of the respective electrodes 12 output from the detection circuit 22 is equal to or larger than the first threshold Sth1 (Smax≥Sth1) (Step S202).

When the maximum detection value Smax is smaller than the first threshold Sth1 (Smax<Sth1) (No at Step S202), the process is returned to Step S200. In other words, in the detection device 1, the period before time t1 and the period after time t6 in FIG. 12 in each of which the maximum detection value Smax is smaller than the first threshold Sth1 (Smax<Sth1), are each considered as a period in which the object to be detected F is not present in the space where the coordinates can be detected. Thus in the periods, the detection device 1 does not perform extraction of the coordinates of the object to be detected F.

When the maximum detection value Smax is equal to or larger than the first threshold Sth1 (Smax≥Sth1) (Yes at Step S202), the signal processor 44 of the processing circuit 23 determines whether or not the maximum detection value Smax is equal to or larger than the second threshold Sth2 (Smax≥Sth2) (Step S203).

When the maximum detection value Smax is smaller than the second threshold Sth2 (Smax<Sth2) (No at Step S203), that is, in the period from time t1 to time t2 and the period from time t5 to time t6 in FIG. 12 in which the maximum detection value Smax is equal to or larger than the first threshold Sth1 and smaller than the second threshold Sth2 (Sth1≤Smax<Sth2), the coordinate extractor 45 of the processing circuit 23 performs processing at step S204 and processing at step S209. That is, the coordinate extractor 45 of the processing circuit 23 acquires the first data Rx, the second data Ry, and the third data Rz indicating the position of the object to be detected F in the space on the detection region AA using the detection value S(n) of each electrode 12 and stores them in the storage 46 (Step S204). The coordinate extractor 45 generates the spatial coordinates R (Rx,Ry,Rz) including the first data Rx, the second data Ry, and the third data Rz (Step S209).

When the maximum detection value Smax is equal to or larger than the second threshold Sth2 (Smax≥Sth2) (Yes at Step S203), the signal processor 44 of the processing circuit 23 determines whether or not the maximum detection value Smax is equal to or larger than the third threshold Sth3 (Smax≥Sth3) (Step S205).

When the maximum detection value Smax is smaller than the third threshold Sth3 (Smax<Sth3) (No at Step S205), that is, in the period from time t2 to time t3 and the period from time t4 to time t5 in FIG. 12 when the maximum detection value Smax is equal to or larger than the second threshold Sth2 and smaller than the third threshold Sth3 (Sth2≤Smax<Sth3), the coordinate extractor 45 of the processing circuit 23 performs processing at Step S206, processing at Step S208, and processing at Step S209. That is, the coordinate extractor 45 of the processing circuit 23 acquires the third data Rz indicating the position of the object to be detected F in the third direction in the space on the detection region AA using the detection value S(n) of each electrode 12 (Step S206). The coordinate extractor 45 reads the first data Rx and the second data Ry stored in the storage 46 (Step S208) and generates the spatial coordinates R (Rx,Ry,Rz) (Step S209).

When the maximum detection value Smax is equal to or larger than the third threshold Sth3 (Smax≥Sth3) (Yes at Step S205), that is, in the period from time t3 to time t4 in FIG. 12, the coordinate extractor 45 of the processing circuit 23 performs processing at Step S207, processing at Step S208, and processing at Step S209. That is, the coordinate extractor 45 of the processing circuit 23 sets the third data Rz indicating the position of the object to be detected F in the third direction stored in the storage 46 to "0" (Step S207). The coordinate extractor 45 reads the first data Rx and the second data Ry stored in the storage 46 (Step S208) and generates the spatial coordinates R (Rx,Ry,0) (Step S209).

In the spatial coordinate detection described above, when the maximum detection value Smax is equal to or larger than the first threshold Sth1 and smaller than the second threshold Sth2 (Sth1≤Smax<Sth2), the detection device 1 generates the spatial coordinates R (Rx,Ry,Rz) including the first data Rx, the second data Ry, and the third data Rz acquired using the detection value S(n) of each electrode 12.

When the maximum detection value Smax is equal to or larger than the second threshold Sth2 and smaller than the third threshold Sth3 (Sth2≤Smax<Sth3), the detection device 1 acquires the third data Rz indicating the position of the object to be detected F in the third direction in the space on the detection region AA using the detection value S(n) of each electrode 12 and generates the spatial coordinates R (Rx,Ry,Rz) using the first data Rx and the second data Ry stored in the storage 46.

When the maximum detection value Smax is equal to or larger than the third threshold Sth3 (Smax≥Sth3), the detection device 1 generates the spatial coordinates R (Rx,Ry,0) by using the first data Rx and the second data Ry stored in the storage 46 and setting the third data Rz to "0".

Thus, the detection device 1 can reduce a deterioration in accuracy of acquiring the proximity detection coordinates when the detection accuracy in the Dx and Dy directions decreases because the size of each electrode 12 is large and the object to be detected F comes into proximity to the detection surface.

While the maximum detection value Smax of the detection values S(n) of the respective electrodes 12 in the detection region AA is used for threshold determination in the spatial coordinate detection described above, the present embodiment is not limited thereto.

The detection device 1 may generate the spatial coordinates R (Rx,Ry,Rz) including the first data Rx, the second data Ry, and the third data Rz acquired using the detection value S(n) of each electrode 12, when at least one of the detection values S(n) of the respective electrodes 12 in the detection region AA is equal to or larger than the first threshold Sth1 and smaller than the second threshold Sth2, for example.

The detection device 1 may acquire the third data Rz indicating the position of the object to be detected F in the third direction in the space on the detection region AA using the detection value S(n) of each electrode 12 and generate the spatial coordinates R (Rx,Ry,Rz) using the first data Rx and the second data Ry stored in the storage 46, when at least one of the detection values S(n) of the respective electrodes 12 in the detection region AA is equal to or larger than the second threshold Sth2 and smaller than the third threshold Sth3, for example.

The detection device 1 may generate the spatial coordinates R (Rx,Ry,0) by using the first data Rx and the second data Ry stored in the storage 46 and setting the third data Rz to "0", when at least one of the detection values S(n) of the respective electrodes 12 in the detection region AA is equal to or larger than the third threshold Sth3, for example.

While exemplary embodiments according to the present disclosure have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the present disclosure.

What is claimed is:

1. A detection device comprising:
   a sensor having a detection region;
   a plurality of electrodes arrayed in a first direction and a second direction different from the first direction in the detection region;
   a detection circuit configured to generate detection values of the respective electrodes based on detection signals output from the electrodes; and
   a processing circuit configured to generate spatial coordinates indicating a position of an object to be detected on or above the detection region, wherein
   the spatial coordinates include first data indicating a position in the first direction, second data indicating a position in the second direction, and third data indicating a position in a third direction orthogonal to the first direction and the second direction,
   the processing circuit is configured to use a first threshold for the detection value and a second threshold larger than the first threshold,
   the processing circuit is configured to acquire the first data, the second data, and the third data based on the detection values of the electrodes and generate the spatial coordinates including the first data, the second data, and the third data when at least one of the detection values of the respective electrodes is equal to or larger than the first threshold and smaller than the second threshold, and
   the processing circuit comprises a storage configured to store therein the first data, the second data, and the third data generated based on the detection values of the electrodes when at least one of the detection values of the respective electrodes is equal to or larger than the first threshold and smaller than the second threshold.

2. The detection device according to claim 1, wherein the processing circuit is configured to read the first data and the second data stored in the storage and sets the third data to 0 to generate the spatial coordinates including the first data, the second data, and the third data when at least one of the detection values of the respective electrodes is equal to or larger than the second threshold.

3. The detection device according to claim 1, wherein
the processing circuit is configured to use a third threshold larger than the second threshold,
the processing circuit is configured to acquire the third data based on the detection values of the electrodes and read the first data and the second data stored in the storage to generate the spatial coordinates including the first data, the second data, and the third data when at least one of the detection values of the respective electrodes is equal to or larger than the second threshold and smaller than the third threshold, and
the processing circuit is configured to read the first data and the second data stored in the storage and set the third data to 0 to generate the spatial coordinates including the first data, the second data, and the third data when at least one of the detection values of the respective electrodes is equal to or larger than the third threshold.

4. The detection device according to claim 1, wherein
the electrode has a side extending in the first direction with a length of 20 mm to 40 mm, and
the electrode has a side extending in the second direction with a length of 20 mm to 40 mm.

5. The detection device according to claim 1, wherein
the sensor comprises:
a sensor substrate provided with the electrodes; and
a cover glass disposed on the sensor substrate in the third direction with an adhesive layer interposed therebetween, and
the spatial coordinates indicate a position of the object to be detected in a space on a surface of the cover glass serving as a detection surface.

6. A detection system comprising:
the detection device according to claim 1; and
a display panel disposed facing the sensor with an air gap interposed therebetween, wherein
the detection region and a display region of the display panel overlap in plan view when viewed in the third direction.

7. A detection device comprising:
a sensor having a detection region;
a plurality of electrodes arrayed in a first direction and a second direction different from the first direction in the detection region;
a detection circuit configured to generate detection values of the respective electrodes based on detection signals output from the electrodes; and
a processing circuit configured to generate spatial coordinates indicating a position of an object to be detected on or above the detection region, wherein
the spatial coordinates include first data indicating a position in the first direction, second data indicating a position in the second direction, and third data indicating a position in a third direction orthogonal to the first direction and the second direction,
the processing circuit is configured to use a first threshold for the detection value and a second threshold larger than the first threshold,
the processing circuit is configured to acquire the first data, the second data, and the third data based on the detection values of the electrodes and generate the spatial coordinates including the first data, the second data, and the third data when at least one of the detection values of the respective electrodes is equal to or larger than the first threshold and smaller than the second threshold, and
the processing circuit is configured to, when at least one of the detection values of the respective electrodes is equal to or larger than the second threshold:
acquire the first data and the second data acquired based on the detection values of the electrodes when at least one of the detection values of the respective electrodes is equal to or larger than the first threshold and smaller the second threshold;
set the third data to 0; and
generate the spatial coordinates including the first data, the second data, and the third data.

8. A detection device comprising:
a sensor having a detection region;
a plurality of electrodes arrayed in a first direction and a second direction different from the first direction in the detection region;
a detection circuit configured to generate detection values of the respective electrodes based on detection signals output from the electrodes; and
a processing circuit configured to generate spatial coordinates indicating a position of an object to be detected on or above the detection region, wherein
the spatial coordinates include first data indicating a position in the first direction, second data indicating a position in the second direction, and third data indicating a position in a third direction orthogonal to the first direction and the second direction,
the processing circuit is configured to use a first threshold for the detection value and a second threshold larger than the first threshold,
the processing circuit is configured to acquire the first data, the second data, and the third data based on the detection values of the electrodes and generate the spatial coordinates including the first data, the second data, and the third data when at least one of the detection values of the respective electrodes is equal to or larger than the first threshold and smaller than the second threshold,
the processing circuit is configured to use a third threshold larger than the second threshold,
the processing circuit is configured to, when at least one of the detection values of the respective electrodes is equal to or larger than the second threshold and smaller than the third threshold:
acquire the third data based on the detection values of the electrodes of the electrodes;
acquire the first data and the second data acquired based on the detection values of the electrodes when at least one of the detection values of the respective electrodes is equal to or larger than the first threshold and smaller the second threshold; and
generate the spatial coordinates including the first data, the second data, and the third data, and
the processing circuit is configured to, when at least one of the detection values of the respective electrodes is equal to or larger than the third threshold:
acquire the first data and the second data acquired based on the detection values of the electrodes when at least one of the detection values of the respective electrodes is equal to or larger than the first threshold and smaller the second threshold;
set the third data to 0; and generate the spatial coordinates including the first data, the second data, and the third data.

\* \* \* \* \*